US006496804B2

(12) United States Patent
McEvoy et al.

(10) Patent No.: US 6,496,804 B2
(45) Date of Patent: *Dec. 17, 2002

(54) BUSINESS SYSTEM AND METHOD OF COMPILING MAILING LIST OF INTERESTED CUSTOMERS

(75) Inventors: Richard B. McEvoy, Newtown, CT (US); Peter von Braun, Greenwich, CT (US)

(73) Assignee: LabelADD, LLC, Greenwich, CT (US)

( * ) Notice: Subject to any disclaimer, the term of this patent is extended or adjusted under 35 U.S.C. 154(b) by 62 days.

This patent is subject to a terminal disclaimer.

(21) Appl. No.: 09/860,290

(22) Filed: May 18, 2001

(65) Prior Publication Data

US 2001/0023408 A1 Sep. 20, 2001

Related U.S. Application Data

(63) Continuation of application No. 09/253,283, filed on Feb. 19, 1999, which is a continuation-in-part of application No. 09/170,688, filed on Oct. 13, 1998, now abandoned, which is a continuation-in-part of application No. 09/090,282, filed on Jun. 4, 1998, now abandoned.

(51) Int. Cl.[7] .............................................. G06F 17/60
(52) U.S. Cl. ...................................................... 705/14
(58) Field of Search ............................... 705/1, 10, 14, 705/26; 283/383, 493, 81, 62, 67, 116

(56) References Cited

U.S. PATENT DOCUMENTS

| 4,307,900 | A | 12/1981 | Krautstack | 283/56 |
|---|---|---|---|---|
| 4,589,590 | A | 5/1986 | McGuire et al. | 229/92.8 |
| 4,791,281 | A | 12/1988 | Johnsen et al. | 235/383 |
| 4,908,761 | A | 3/1990 | Tai | 705/14 |
| 5,232,248 | A | 8/1993 | Talbott | 283/81 |
| 5,353,218 | A | 10/1994 | De Lapa et al. | 705/14 |
| 5,612,527 | A | 3/1997 | Ovadia | 235/383 |
| 5,799,981 | A | 9/1998 | Tung et al. | 283/56 |
| 5,970,469 | A | 10/1999 | Scroggie et al. | 705/14 |
| 6,014,634 | A | 1/2000 | Scroggie et al. | 705/14 |
| 6,026,370 | A | 2/2000 | Jermyn | 705/14 |
| 6,016,660 | A | 5/2000 | Eggleston et al. | 705/14 |
| 6,276,724 | B1 * | 8/2001 | Zorn | 283/56 |

FOREIGN PATENT DOCUMENTS

| CA | 2268688 | * 12/1999 | 705/14 |
|---|---|---|---|

OTHER PUBLICATIONS

US 5,710,888, 1/1998, Christensen et al. (withdrawn)
Award Track, e-news.com, Establishing Marketing Partnership, Business Wire, Mar. 14, 2000.*

* cited by examiner

Primary Examiner—Stephen Gravini
(74) Attorney, Agent, or Firm—St. Onge Steward Johnston & Reens LLC

(57) ABSTRACT

A system and method for using a mailing label to be applied to magazines, newspapers, circulars or other mass mailing items, which has a subscriber's name and address. The label can be removed from the mailed item and applied to a coupon for retail redemption or to a return mailer, so that the subscriber information can be extracted from the coupon or return mailer, and used to generate a database of computer records forming a mailing list of desirable, motivated customers for the product being promoted.

12 Claims, 2 Drawing Sheets

BUSINESS SYSTEM AND METHOD OF COMPILING MAILING LIST OF INTERESTED CUSTOMERS

RELATED U.S. APPLICATION DATA

This is a continuation of application Ser. No. 09/253,283 filed Feb. 19, 1999, which is a continuation-in-part of application Ser. No. 09/170,688, filed on Oct. 13, 1998, now abandoned which is a continuation-in-part of application Ser. No. 09/090,282, filed on Jun. 4, 1998 now abandoned.

FIELD OF THE INVENTION

The present invention relates generally to business systems in the field of marketing, and specifically, to systems and methods for creating and maintaining lists of desirable, motivated customers, which lists can be used by a product manufacturer or distributor in targeted marketing directed to customers who are likely to be responsive to advertising or marketing materials.

BACKGROUND OF THE INVENTION

Sales generating materials, typically discount coupons or sweepstakes prize tickets, have long been distributed by manufacturers to merchandise their products and by retail stores to attract consumers to their particular stores. Both coupon types are typically distributed on a large scale basis as free-standing inserts ("FSIs") in newspapers, direct mail, door to door distribution, and other forms of mass distribution. Such coupons are generally of limited effectiveness in increasing consumer purchases. For example, redemption rates for free-standing inserts are approximately in the range of one to three percent (1–3%) and are decreasing every year.

A further problem of FSIs as a coupon distribution system is the fraud problem known as gang-cutting. In this scheme, the coupons are diverted from the distribution channel, then cut up into individual coupons, then bundled and submitted for redemption by dishonest retailers through the usual redemption channels. The manufacturer then credits the redeeming retailer with the value of the coupons, even though a consumer never actually purchased a product using the coupon, which would warrant the grant of such a credit. This problem is sufficiently significant that coupons distributed through a FSI are usually limited in their dollar value. Even without such fraud, there is still a significant misredemption rate arising from incorrect identification of the coupons.

In order to alleviate these problems, consumer product firms are perpetually seeking ways to identify and target their sales promotions to their core constituencies who will respond to the marketing effort. A series of systems have been suggested for creating coupon systems which identify the consumer who redeems the coupon, but typical systems which require the consumer to fill out a form, or to use computer program to enter data then print coupons, or to use a store identification card, often have low rates of compiling complete data.

As a consequence, numerous firms are in the business of creating and leasing mailing lists to consumer product marketing companies, who will often process these list in various ways in an effort to select customers to receive a coupon, mailing or other advertising or marketing solicitation that are most likely to be responsive to such solicitation. As noted, the typical response rate for an FSI is quite low; the response rate is also very low for uncontrolled mass mailing of coupons or other sales solicitations for consumer products. Typically, such mass mailed items, such as brochures, flyers, and the like contain inquiry cards or product promotion redemptions, which can be returned to so called fulfillment houses for credits or refunds; or they may contain coupons redeemable at retail where a customer will receive price discounts on new product purchases. The coupons redeemed at retail are also returned to fulfillment houses, but do not contain nor are they usually required to have the customer name and address. While millions of such coupons are redeemed at retail annually, the product manufacturer rarely learns the name and address of the redeeming customer. Given the expense of printing and distributing such sales solicitations, there is an exceptional need for methods to create and maintain mailing and other lists of consumers who are likely to be motivated to purchase a particular product.

SUMMARY OF THE INVENTION

It is an object of the invention to provide a computer-implemented method and system to identify desirable customers for targeted advertising or marketing, and to use a list of such identified customers as the primary target for coupons and other sales triggering promotions.

A specific object of the invention is to provide a system and method for using a mailing label to be applied to magazines, newspapers, circulars or other mass mailing items, which has a subscriber's name and address, which label can be removed and used in connection with coupon redemption, in order to generate a mailing list of desirable, motivated customers.

More broadly, the present invention is a computer-implemented method of identifying desirable customers for targeted advertising or marketing, comprising the steps of: (1) applying a removable label, bearing information identifying a subscriber, to a subscription periodical publication delivered to the subscriber; (2) providing a customer benefit program activated by removing the removable label from the publication and applying the removable label to a customer benefit redemption form; (3) creating a computer database record containing information identifying a subscriber who participates in the customer benefit program by removing the label from the publication and applying the removable label to a customer benefit redemption form and submitting the customer benefit redemption form to a redemption agent; and (4) compiling, from one or more of the records, a computer database comprising records of the persons who participate in the customer benefit program, as well as records identifying a product whose sale is promoted by the customer benefit program. The computer database is then used to generate delivery of product information or product offers related to products promoted in the customer benefit program to persons listed in the database. Delivery of such promotional materials may typically be by U.S. Postal Service, but other methods, including personal delivery or electronic mail service may also be utilized, depending on the nature of the information collected.

The subscriber identifying information will typically comprise the name and address of the subscriber. Preferably, this information is embodied in a machine readable text, or codes such as numeric codes, or scannable bar codes.

In order to attract the customer's attention to the customer benefit program, the removable label further is provided with advertising indicia, such as a logo or slogan identifying a company which is providing the customer benefit program and/or information for locating the customer benefit redemption form in the publication. In one preferred embodiment, an advertising message is imprinted in a substrate below the removable label, so that it becomes visible upon removal of the label.

The customer benefit redemption form may comprise a store discount coupon, or a returnable form, or other benefit to the consumer. In one embodiment, the customer benefit redemption form is a high value store discount coupon. In another embodiment, the customer benefit redemption form comprises a mail in form, which when returned, will trigger delivery of a product or value, such as a store discount coupon.

The foregoing and other features of the present invention are more fully described with reference to the following drawings annexed hereto. Other objects, features and advantages of the present invention will be apparent from the description hereinafter.

DESCRIPTION OF THE PREFERRED EMBODIMENT

Figure 1:
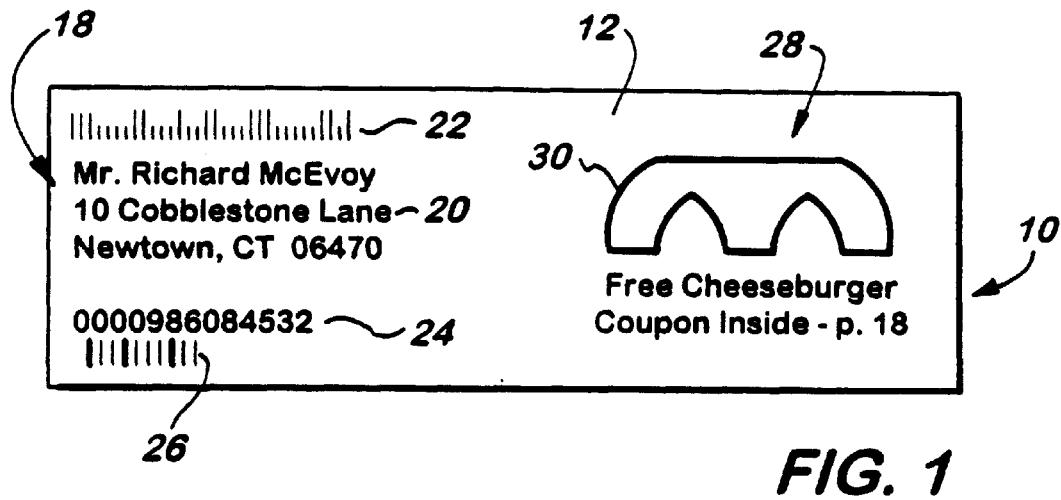
FIG. 1 is a plan view of an embodiment of a mailing label used in the system and method of the present invention showing the respective locations of address indicia and advertising print.

Broadly, the goal of the present invention is to provide a comprehensive and integrated system of doing business through direct response vehicles on the front cover of, and placed in the interior of, requested, subscription periodical publications. This business system operates on behalf of both third party advertisers and the publication itself (for subscription renewals, etc.). This business system covers a variety of sales and marketing techniques, including, but not limited to, promotions, sampling, direct mail substitution, triggers of telemarketing (outbound and inbound), personal solicitation, and door-to-door sales.

The vehicle inside the magazine contains a marketing message which motivates the prospective customer to respond via a reply device (card or coupon, etc.) included in the inside advertising message. In order to "activate" the reply device, the customer is motivated to detach or "peel off" the label on the front cover of the publication and attach it to the response vehicle. In addition to the advertisement on the face of the peel off label, an additional advertisement can be printed on the "matte" or below a transparent matte which remains a permanent part of the cover after the peel off label has been removed.

The two most likely response methods are (1) redemption at retail stores; and (2) use of a bounceback card.

Redemption of retail stores will operate as follows. The coupon is detached from the magazine and is "validated" by detaching the label and reattaching it to the coupon. The completed coupon is redeemed at advertiser-designated retailers for the promotional item specified by the advertiser in the inpublication offer. Because the address label is attached to the coupon, each coupon bears a discrete name, address, zip and bar code in machine readable format. This has four major effects. (A) The advertiser is able to achieve a much higher return factor because of the convenience involved in simply detaching the label and affixing it to the bounceback card. Many consumers will not move from their couch to get a pen or pencil to fill out a bounceback card. (B) the presence of the advertising indicia on the front cover of the publication generates many impressions on the potential customer and increases the likelihood that the customer will turn to the advertiser's ad. This also increases the frequency with which a customer will respond to the offer. (C) The advertiser is able to determine the specific identity of each person accepting his offer and redeeming the coupon. This provides the information needed to construct databases of customers that can be used in follow-on marketing and sales efforts. (D) "Misredemption" or fraudulent redemption practices, which can cost advertisers up to 50% of the total cost of a couponing campaign, can be made much more difficult. Specifically, because each coupon presented by a retailer for reimbursement will bear a discrete name, address, zip and bar code, misredemption is made extremely difficult, and potentially, not economically worthwhile. This is because it is costly and very difficult for a retailer to forge the labels and to create an accurate match with the subscription list of the publication carrying the coupon.

The net effect of these four elements is to make it economically feasible for advertisers to use welcomed, targeted periodical publications as a vehicle for broad scale promotional marketing campaigns, including higher value offers (such as $1 or $2 coupons) which are not feasible for use in current couponing vehicles, such as FSIs and inserts that are mass distributed through newspapers and other media.

Use of a bounceback card will operate as follows. A bounceback card is included in the magazine (this caries the address of the fulfillment facility and prepaid business postage). The customer removes the bounceback card from the magazine and is "validated" by detaching the label and re-attaching it to the bounceback card. The completed bounceback card is then mailed to the advertiser-designated address for the item specified by the advertiser in the inpublication offer. Because the address label is attached to the bounceback card, each coupon bears a discrete name, address, zip and bar code in machine readable format. This has three major effects, similar to those associated with the retail redemption coupon system discussed above. (A) The advertiser is able to achieve a much higher return factor because of the convenience involved in simply detaching the label and affixing it to the bounceback card. Many consumers will not move from their couch to get a pen or pencil to fill out a bounceback card. (B) The presence of advertising indicia on the front cover of the publication generates many impressions on the potential customer and increases the likelihood that the customer will turn to the advertiser's ad. This also increases the frequency with which a customer will respond to the offer. (C) The information provided by the customer to the advertiser is much more readable, enabling the advertiser to more accurately determine the specific identity of each person accepting his offer and redeeming the coupon. This provides the information needed to construct databases of customers that can be used in follow-on marketing and sales efforts.

In order to support the consumer level operation of the method and system of the present invention, services of a number of different companies may need to be engaged to implement the system and method. These include (1) Coupon redemption services: In order to make the redeem at retail system work, advertisers must have access to a redemption service which receives the coupons submitted by retailers, checks them for validity, carries out first level fraud control, calculates the reimbursement amount due each participating retailer, creates accounting records for the advertiser and facilitates payment. (2) Database construction services: The information covering the customer who has redeemed the coupon, the offer to which the customer responded, and the retailer (location, timing, total volume, etc.) must be read onto a computer medium, tabulated and converted into a readable computer file for future use by the advertiser. Subsequent redemptions and customer activity need to be recorded compared with the original file and added to the database with the appropriate annotation with respect to the offer, the retailer and its location, and other marketing data. Computer services of this type are typically available from computer service bureaus. (3) Market research services: The databases need to be examined and mined on behalf of specific and general advertisers and researchers, with respect to the effectiveness of the marketing campaign (pricing sensitivity and elasticity, cross promotions, premiums, purchase continuity programs, negative option programs, rebate offers, individualized incentive programs, trial, trade marketing and promotions, couponing, pre- and post-awareness, cost, attitude and usage, database value and effectiveness, recency and frequency, club programs, penetration, demographic, segmentation, geographic, lifestyle, and psychographic information needed to determine the motivational characteristics and the value of the customer to the advertiser and spending allocation by customer value, as well as the economics of the campaign), suggest additional marketing programs which show the prospect of profitable exploitation of the information and market opportunity, evaluate sales coverage and retailer effectiveness through such techniques as geomapping to measure advertising spending allocation such as coop spending, sales force deployment and targeting, program selling, detailing to healthcare providers and others requiring personal selling, performance monitoring (sales, margin, share, turnover, returns, satisfaction), idea generation and testing, new product testing, product line and mix management and rationalization, customer analysis (who, where, what they buy, how they buy, what they intend to buy and other segmentation data), etc. (4) Follow-on marketing and sales campaigns: New marketing and sales campaigns must be designed and executed, including additional promotions, direct mail, pre- and post-telemarketing campaigns, either in conjunction with the advertiser or with the advertiser and its marketing agency. This will directly influence such marketing elements as brochures, newsletters, catalogs, coop mailings and programs, sampling, statement inserts, product or service specific communications, faxes, broadcaster, internet methods, interactive cable and computer, on package messages, advertising specialties, package inserts, point of sale, warranty cards, surveys, sweepstakes, contests, take-ones, etc. (5) List Management: As lists are developed using the system and method of the invention, these lists must be updated, developed, managed, and with the permission of the list owner, remarketed.

Where the system and method of the invention are implemented as a bounceback card system, the additional services that would be required will include a bounceback response card fulfillment service bureau which receives the bounceback response cards mailed in by customers, checks them for validity, carries out first level fraud control, removes the requested merchandise from inventory, packages it, prepares it for shipment, ships it to the customer requesting it, debits inventory, restocks as necessary, creates accounting records for the advertiser and facilitates payment.

Figure 2:
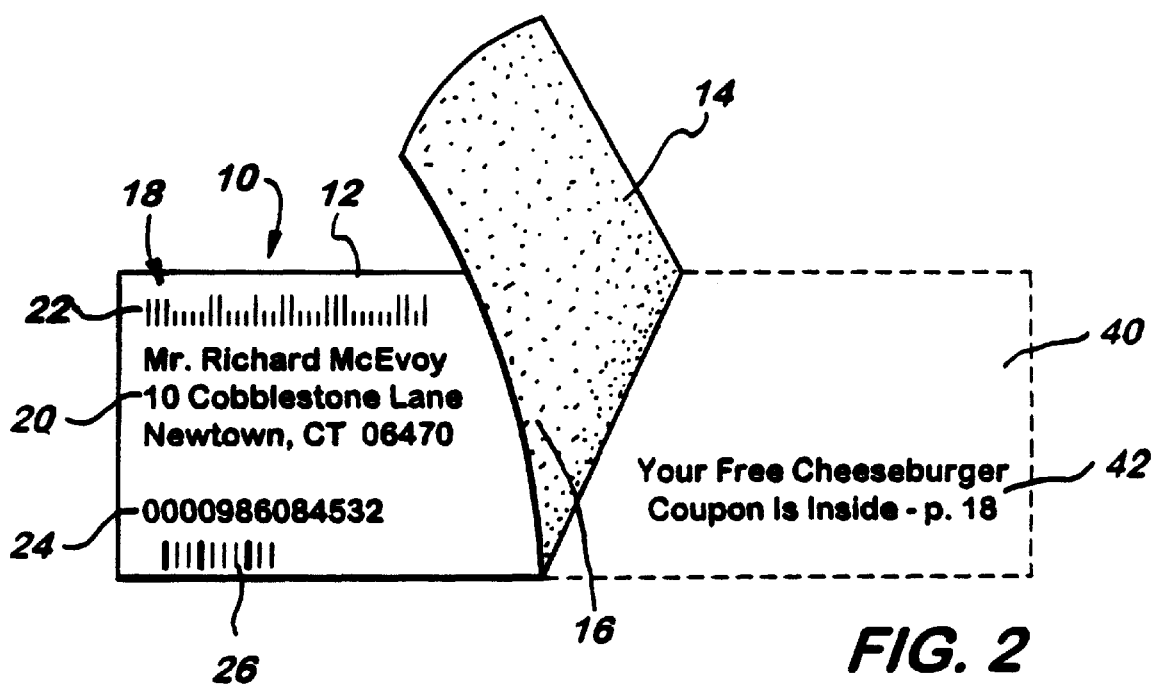
FIG. 2 is a plan view similar to that of FIG. 1 illustrating different positions than shown in FIG. 1 for the address indicia and the advertising print, and showing one corner of the label turned up.

Referring now FIGS. 1–2, reference numeral 10 generally indicates an embodiment of a removable mailing label used in the system and method of the present invention. The removable mailing label 10 can be created from a variety of materials, but is typically paper, having a front surface 12 and a rear surface 14, backed by a releasable adhesive 16. Adhesive 16 is used to secure the mailing label 10 to the item being mailed. The adhesive 16 is releasable, for example, the adhesive may be one of the types of adhesives typically used in piggyback labels, thereby allowing the label 10 to be easily peeled away from the item to which it was secured, and reapplied to a new item such as a bounceback card, including a return post card, inquiry card or credit, or to a retail redemption coupon.

The removable mailing label 10 can have almost any shape, but is typically the rectangular address label used by many magazines. The front surface of the label will be receptive to a printing process so that print can be applied thereto. A first area 18 of the front surface 12 will carry indicia 20 including name and address of the recipient. Bar code indicia 22, which can be used by the postal service for proper sorting and delivery also be printed in the first area 18.

In addition to the name and address (as text), and the usual postal bar codes, an identifying coding for the recipient or subscriber is also preferably contained on the label 10. Such coding may comprise numeric codes 24 or additional bar coding 26 which uniquely identifies the addressee of the label (as by an account number) in relation to a database kept by the company distributing the magazines.

A second area 28 of mailing label 10 will carry advertising indicia 30. In the embodiments shown in the drawings, the advertising material depicted is a corporate logo, but it may take other forms, including a marketing slogan, a trademark, a picture, printed hologram, corporate identity or any combination of these. The advertising message on a welcomed and targeted publication is designed to capture the prospective customer's attention, and motivates that customer to turn to a specific advertisement and marketing device located inside the magazine.

As an additional benefit, the presence of the advertising indicia 30 on mailing label 10 not only builds brand awareness but can trigger several research benefits, such as copy testing, creative strategy testing, creative execution testing, telemarketing overlays, and can build channel strategies to maximize sales through different types of stores and vendors, such as specialty stores, mass merchandisers, bulk warehousing clubs, etc. The net impact of the system and method of the invention is to create actionable media within a system of two-way communication between the advertiser and the customer which has not previously been available in this way.

Figure 3:
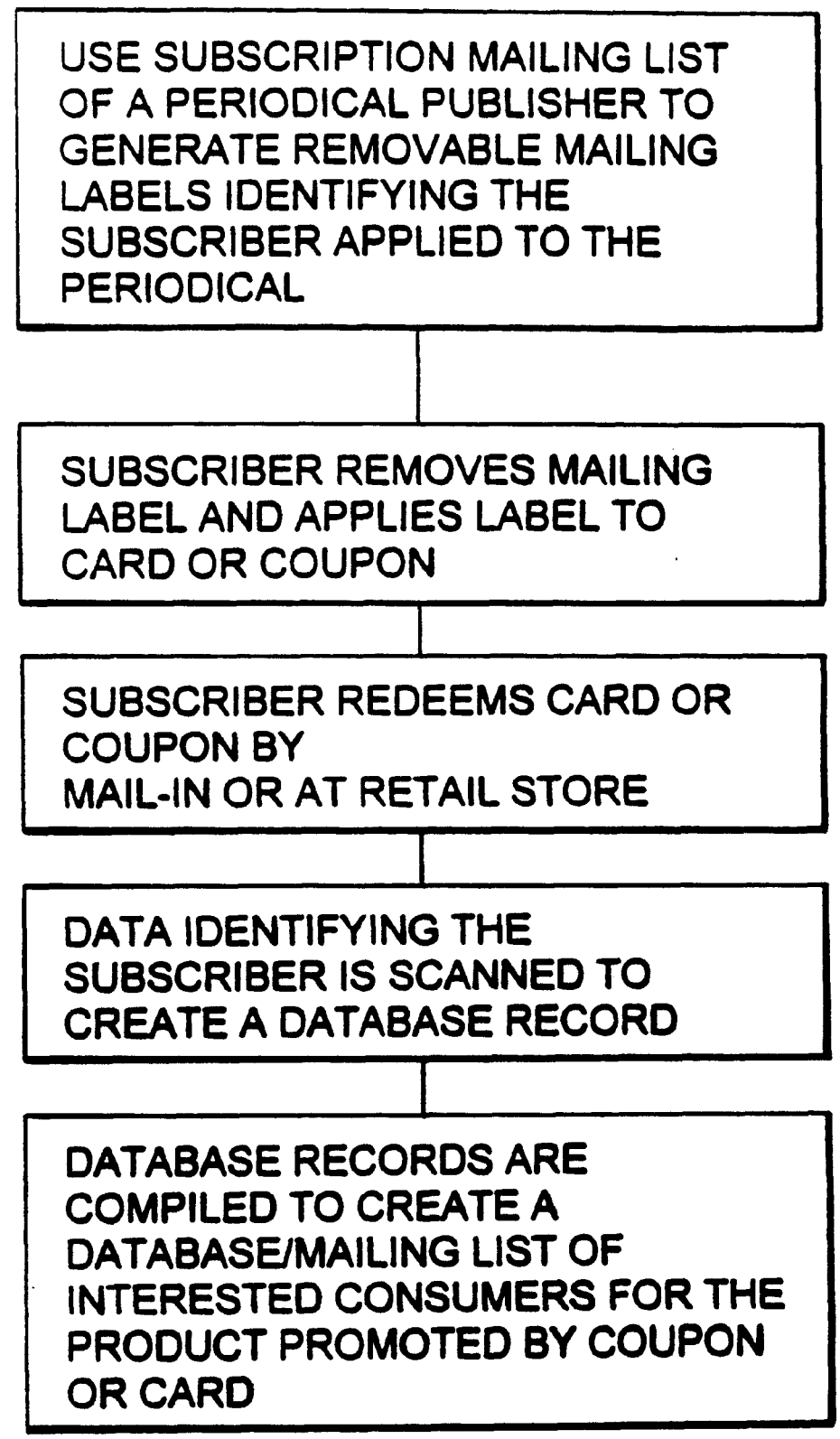
FIG. 3 is a flow chart illustrating the steps of the system and method of the present invention.

Referring now to FIG. 3, a flowchart showing the present invention is shown as a computer-implemented method of identifying desirable customers for targeted advertising or marketing, comprising the steps of: (1) applying a removable label, bearing information identifying a subscriber, to a subscription periodical publication delivered to the subscriber; (2) providing a customer benefit program activated by removing the removable label from the publication and applying the removable label to a customer benefit redemption form; (3) creating a computer database record containing information identifying a subscriber who participates in the customer benefit program by removing the label from the publication and applying the removable label to a customer benefit redemption form and submitting the customer benefit redemption form to a redemption agent; and (4) compiling, from one or more of the records, a computer database comprising records of the persons who participate in the customer benefit program, as well as records identifying a product whose sale is promoted by the customer benefit program. The computer database is then used to generate delivery of product information or product offers related to products promoted in the customer benefit program to persons listed in the database. Delivery of such promotional materials may typically be by U.S. Postal Service, but other methods, including personal delivery or electronic mail service may also be utilized, depending on the nature of the information collected.

As noted above, the subscriber identifying information will typically comprise the name and address of the subscriber, and preferably, this information is embodied in a machine readable text, or codes such as numeric codes, or scannable bar codes.

In order to attract the customers' attention to the customer benefit program, the removable label is provided with the advertising indicia 30, and/or information for locating the customer benefit redemption form in the publication. In one preferred embodiment, an advertising message 42 is imprinted in a substrate 40 below the removable label, so that the advertising message 42 becomes visible upon removal of the label 10.

As prior discussed, the customer benefit redemption form may comprise a store discount coupon, or a returnable form, or other benefit to the consumer. In one embodiment, the customer benefit redemption form is a high value store discount coupon. In another embodiment, the customer benefit redemption form comprises a mail in form, which when returned, will trigger delivery of a product or value, such as a store discount coupon.

In summary, we provide a system and method for using a mailing label to be applied to magazines, newspapers, circulars or other mass mailing items, which has a subscriber's name and address, which label can be removed and used in connection with coupon redemption, in order to generate a mailing list of desirable, motivated customers. The method and system can be used to obtain the following desirable effects for a consumer marketing company: (1) Increase sales, increase market share, increase consumption, achieve new trial by prospective customers, attract brand switchers, enhance repeat purchasing, increase usage rate, and/or encourage consumer willingness to try new or different products. (2) Preempt a competitive action such as the launching of a new product, defend market share, signal competition, and/or deter entry of competing products. (3) Increase product market and/or geographic distribution, cushion a price increase, motivate a sales force, reinforce print and television advertising, and/or reposition products in the marketplace. (4) Assist in the achievement of retailer objectives, such as generating store traffic, reinforcing retailer positioning as discount or low-price store, increase sales of complementary products, attract customers to higher margin items, generate or maintain store loyalty, and/or increase category profit.

The invention has been described and illustrated in connection with certain preferred embodiments which are illustrative of the principles of the invention. However, it should be understood that various modifications and changes may readily occur to those skilled in the art, and it is not intended that the invention be limited to the constructions and operation of the embodiments described herein. Accordingly, additional modifications and equivalents may be considered as falling within the scope of the invention as defined by the claims herein below.

What is claimed is:

1. A computer-implemented method of identifying desirable customers for targeted advertising or marketing, comprising the steps of:

applying a removable mailing label, bearing a name and address for identifying a subscriber, to a subscription periodical publication delivered to the said subscriber;

providing a customer benefit program activated by removing said removable mailing label from said publication and applying said removable mailing label to a customer benefit redemption form;

creating a computer database record containing information identifying a subscriber, who participates in said customer benefit program by removing said label from said publication and applying said removable mailing label to a customer benefit redemption form and submitting the customer benefit redemption form to a redemption agent;

compiling a computer database comprising records of said persons who participate in said customer benefit program, and also containing records identifying a product whose sale is promoted by said customer benefit program, from one or more of said records.

2. A method in accordance with claim 1, further comprising machine readable text or codes identifying the name and address of the said subscriber imprinted on said removable mailing label.

3. A method in accordance with claim 2, wherein said machine readable codes comprise bar codes.

4. A method in accordance with claim 1, wherein said removable mailing label further is provided with advertising indicia.

5. A method in accordance with claim 4 wherein said advertising indicia comprises a logo or slogan identifying a company which is providing said customer benefit program.

6. A method in accordance with claim 5 wherein said advertising indicia further comprises information for locating said customer benefit redemption form in said publication.

7. A method in accordance with claim 1, wherein said customer benefit redemption form comprises a store discount coupon, or a returnable form.

8. A method in accordance with claim 7, wherein said store discount coupon comprises a high value coupon.

9. A method in accordance with claim 7, wherein said returnable form comprises a mail in form for a store discount coupon.

10. A method in accordance with claim 1, wherein an advertising message is imprinted in a substrate below said removable mailing label, said advertising message being visible upon removal of said label.

11. A method in accordance with claim 1, further comprising the steps of delivering product information or product offers related to products promoted in said customer benefit program to persons listed in said computer database.

12. A method in accordance with claim 11, wherein said product information or product offers are delivered by one or more of personal delivery, postal mail service, and electronic mail service.

* * * * *